United States Patent [19]

Nametkin et al.

[11] 4,129,550

[45] Dec. 12, 1978

[54] SELF-LUBRICATING HEAT-RESISTANT MATERIAL AND PROCESS FOR MANUFACTURING SAME

[76] Inventors: Nikolai S. Nametkin, Leninsky prospekt, 13, kv. 11; Georgy V. Vinogradov, ulitsa Chernyshevskogo, 41, kv. 26; Jury Y. Podolsky, prospekt Vernadskogo, 81, kv. 70; Nina T. Pavlovskaya, ulitsa Krasikova, 19, kv. 19; Ernest I. Frenkin, Leninsky prospekt, 57, kv. 147; Jury G. Yanovsky, B. Serpukhovskaya, 48, korpus 1, kv. 11, all of Moscow, U.S.S.R.

[21] Appl. No.: 570,791

[22] Filed: Apr. 23, 1975

[30] Foreign Application Priority Data

Apr. 24, 1974 [SU] U.S.S.R. .............................. 2017551

[51] Int. Cl.$^2$ .......................... C08K 3/04; C08K 3/30; C08K 3/38
[52] U.S. Cl. ............................... 260/42.22; 260/42.32; 260/42.38
[58] Field of Search ............... 260/42.22, 42.32, 42.38; 526/21; 528/481; 252/12, 12.2, 12.4, 12.6

[56] References Cited

U.S. PATENT DOCUMENTS

| | | | |
|---|---|---|---|
| 1,901,044 | 3/1933 | Schmidt et al. ............... | 528/481 X |
| 2,871,216 | 1/1959 | Anderson ..................... | 260/42.32 |
| 3,400,091 | 9/1968 | Stumpe ........................ | 260/42.32 |
| 3,438,933 | 4/1969 | Bartsch ........................ | 260/42.32 |
| 3,756,982 | 9/1973 | Karshak et al. .............. | 260/42.22 |
| 3,779,918 | 12/1973 | Ikeda et al. ................. | 252/12 X |
| 3,867,333 | 2/1975 | Vanderbilt ................... | 260/42.32 |
| 3,985,660 | 10/1976 | Lankamp ..................... | 252/12 |

FOREIGN PATENT DOCUMENTS 1213940  11/1970  United Kingdom.

*Primary Examiner*—Sandra M. Person
*Attorney, Agent, or Firm*—Haseltine, Lake & Waters

[57] ABSTRACT

A self-lubricating heat-resistant material which, in accordance with the invention, comprises from 20 to 90 percent by weight of a polymer binder, viz. poly(butadiene) with a degree of cross-linking from 30 to 95 percent, and from 10 to 80 percent by weight of an antifriction filler, viz. molybdenum disulphide, graphite, boron nitride or a mixture thereof; said material is produced, in accordance with the invention, by pressing a composition consisting of from 20 to 90 percent by weight of poly(butadiene) of molecular weight between 20,000 and 800,000 and from 10 to 80 percent by weight of said antifriction filler, the process being effected at a temperature in the range from 200° to 330° C. and a pressure of from 1,000 to 7,000 kg/sq.cm.

The self-lubricating heat-resistant material of the invention exhibits thermal stability at temperatures of up to 350° C., a stable coefficient of friction and excellent wear resistance in the temperature range from −150° to +350° C.

5 Claims, No Drawings

SELF-LUBRICATING HEAT-RESISTANT MATERIAL AND PROCESS FOR MANUFACTURING SAME

The present invention relates to antifriction polymeric materials and to processes for manufacturing same; more specifically, it relates to a self-lubricating heat-resistant material and a process for manufacturing same.

The material of this invention may find application in numerous branches of engineering (aircraft and automotive industry, consumer goods and household appliances production) for manufacturing components of friction assemblies which provide for normal operation of machines and mechanisms without lubricating oils or greases.

It is known in the art to employ self-lubricating materials wherein the binding agent is polycarbonate or phenolphthalein-phenolformaldehyde resin and the antifriction filler is tetrafluoroethylene or molybdenum disulphide. It is further known in the art to employ an antifriction polymeric material on the basis of poly(imide) resin which additionally comprises poly(arylates) or aromatic poly(amides), with molybdenum disulphide or graphite being used as the antifriction filler. Apart from the above-listed ingredients, said known material may also include metallic powders (copper or silver). The prior art material in question is produced by pressing a compound consisting of a polymer binder, viz. poly(imide) combined with poly(arylates) or aromatic poly(amides), and an antifriction filler, viz. molybdenum disulphide or graphite, with an optional metallic component, viz. copper or silver powders, the process being effected at a temperature between 390° C. and 500° C. and a pressure between 1,000 and 1,200 kg/sq.cm.

The prior art antifriction materials have a limited thermal range of applications, below 270° C. A further disadvantage of these materials lies in the fact that the polymer binding components thereof can only be produced in sophisticated procedures of organic synthesis employing prohibitively costly raw materials.

It is an object of the present invention to provide a self-lubricating material and a process for manufacturing same using a polymer binder of increased thermal stability showing high performance in a wide range of minus and plus temperatures and further characterized by the cheapness and availability of the polymer binder, ease of manufacture of the feedstock compositions and high machinability of the material produced.

The foregoing objects are attained by the provision of a self-lubricating heat-resistant material comprising a polymer binder and an antifriction filler, which, in accordance with the invention, consists of 20 to 90 percent by weight of the polymer binder, viz. poly(butadiene) with a degree of cross-linking from 30 to 95 percent, and 10 to 80 percent by weight of the antifriction filler, viz. molybdenum disulphide, graphite, boron nitride or a mixture of said compounds.

The self-lubricating heat-resistant material in accordance with the invention preferably contains from 30 to 50 percent by weight of poly(butadiene) with a degree of cross-linking from 30 to 95 percent and from 50 to 70 percent by weight of molybdenum disulphide.

The self-lubricating heat-resistant material in accordance with the invention may optionally contain from 20 to 40 percent by weight of powdered copper.

There is proposed a process for manufacturing a self-lubricating heat-resistant material by thermopressing a composition on the basis of a polymer binder and containing an antifriction filler, wherein, in accordance with the invention, a composition containing from 20 to 90 percent by weight of poly(butadiene) of molecular weight from 20,000 to 800,000 as the polymer binder and from 10 to 80 percent by weight of molybdenum disulphide, graphite, boron nitride or a mixture thereof as the antifriction filler, is subjected to pressing at a temperature of from 200° and 330° C. and a pressure of from 1,000 to 7,000 kg/sq.cm.

The proposed self-lubricating heat-resistant material features high thermal stability at temperatures up to 350° C., a stable coefficient of friction and high wear resistance in a range of temperatures from −150° C. in air, in a medium of inert gases and in high vacuum. The material offers excellent machinability and is capable of retaining its shape and dimensions upon prolonged heating at various temperatures up to 350° C. One of the most important advantages of the proposed antifriction material over the prior art materials consists in the fact that it is produced from poly (butadiene), a widely available and cheap product manufactured in large commercial quantities.

The above-listed favourable properties of the proposed material are ensured, on the one hand, by the composition of the compound from which it is fabricated and, on the other hand, by the process for converting said compound to the material of the invention.

The high heat-resistance, hardness and wear resistance of the proposed material are provided for by the use, as the binder, of poly(butadiene) subjected to cross-linking without resort to special cross-linking agents, the degree of cross-linking being a decisive factor. Thus, with a degree of cross-linking below 30 percent, the material shows poor hardness, low thermo-oxidative stability and poor wear resistance. At the other extreme, a degree of cross-linking above 95 percent results in increased brittleness and, hence, poor machinability of the material.

The high antifriction properties of the material of the invention are furnished by its antifriction component, so that at levels of the antifriction component below 10 percent the material is characterized by a high coefficient of friction (up to 0.3 to 0.5); whereas, if the proportion of the antifriction component exceeds 80 percent, the material does not lend itself to molding due to its low content of the binder.

In order to raise the thermal conductivity of the material, the starting compound may include powdered copper to the extent of from 20 to 40 percent.

The proposed process for producing the self-lubricating heat-resistant material of this invention includes the steps of mixing poly(butadiene) of molecular weight from 20,000 to 800,000 (from 20 to 90 percent by weight) with molybdenum disulphide or graphite or boron nitride or a mixture thereof (at any ratio of said components in the mixture) (from 10 to 80 percent by weight) on rollers to the point where a homogeneous compound is obtained, and pressing said compound at a pressure of from 1,000 to 7,000 kg/sq.cm. and a temperature of from 200° to 330° C. In the course of pressing, the poly(butadiene) gets cross-linked through the opening of double-links to form a space network, providing for a high thermal stability of the material. The proposed process is distinguished by virtue of the fact that it uses no common cross-linking agents to produce the cross-linked poly(butadiene). The space network density, or the degree of cross-linking of poly(butadiene), is controlled by varying the temperature and pressure of the pressing procedure: higher temperatures and pressures raise the degree of cross-linking, permitting variation of the mechanical properties of the material. There are limits to the control capability, however, for at pressures in excess of 7,000 kg/sq.cm. and at temperatures above 330° C. the product material is brittle, while at pressures and temperatures below 1,000 kg/sq.cm. and 200° C., respectively, the material has inadequate characteristics in terms of hardness, heat resistance and wear resistance.

The invention will be better understood from the following examples illustrating the proposed process and the mechanical properties of the proposed self-lubricating heat-resistant material.

EXAMPLE 1

20 g of poly(butadiene) of molecular weight 20,000 is mixed on microrollers with 80 g of molybdenum disulphide of particle size from 1 to 10 microns until a homogeneous compound is produced, after which the compound thus produced is subjected to pressing at a pressure of 7,000 kg/sq.cm. and a temperature of 330° C. for 30 minutes.

The product antifriction material has the following physical and mechanical characteristics:

Poly(butadiene) cross-linking degree — 95%
Vickers hardness — 45.6 kg/sq.cm
Shear modulus — $3.3 \times 10^{10}$ dyne/sq.cm
Linear wear at a specific pressure of 1 kgf/sq.cm — $0.8 \times 10^{-9}$
Coefficient of friction — 0.04
Upper temperature limit — 350° C.
Lower temperature limit — minus 150° C.

EXAMPLE 2

50 g of poly(butadiene) of molecular weight 800,000 and 50 g of graphite are mixed on microrollers to produce a homogeneous compound which is subjected to 1-hour pressing at a pressure of 1,000 kg/sq.cm and a temperature of 280° C.

The product antifriction material has the following physical and mechanical characteristics:

Poly(butadiene) cross-linking degree — 30%
Shear modulus — $5.0 \times 10^{8}$ dyne/sq.cm
Coefficient of friction in a $2 \times 10^{-7}$ mm Hg vacuum — 0.07
Upper temperature limit — 350° C.
Lower temperature limit — minus 150° C.

EXAMPLE 3

90 g of poly(butadiene) of molecular weight 219,000 and 10 g of boron nitride are mixed on microrollers until a homogeneous compound is formed which is then subjected to pressing at a temperature of 5,000 kg/sq.cm and a temperature of 200° C. for 2 hours.

The sproduct antifriction material has the following physical and mechanical characteristics:

Poly(butadiene) cross-linking degree — 65%
Shear modulus — $8.0 \times 10^{9}$ dyne/sq.cm
Vickers hardness — 22.0 kgf/sq.cm
Coefficient of friction in helium — 0.16
Upper temperature limit — 350° C.
Lower temperature limit — minus 150° C.

EXAMPLE 4

30 g of poly(butadiene) of molecular weight 300,000, 15 g of graphite, 15 g of boron nitride and 40 g of powdered copper are mixed on microrollers and pressed at a pressure of 5,000 kg/sq.cm and a temperature of 300° C. for one hour.

The product antifriction material has the following physical and mechanical characteristics:

Poly(butadiene) cross-linking degree — 84%
Shear modulus — $4.1 \times 10^{10}$ dyne/sq.cm
Vickers hardness — 42.2 kgf/sq.mm
Linear wear at a specific pressure of 1 kgg/sq.cm — $7.2 \times 10^{-10}$
Coefficient of friction — 0.1
Upper temperature limit — 350° C.
Lower temperature limit — minus 150° C.

EXAMPLE 5

30 g of poly(buradiene) of molecular weight 219,000, 50 g of molybdenum disulphide and 20 g of powdered copper are mixed on microrollers and pressed at a pressure of 3,000 kg/sq.cm. and a temperature of 250° C. for 30 minutes.

The product antifriction material has the following physical and mechanical characteristics:

Poly(butadiene) cross-linking degree — 48%
Shear modulus — $5.6 \times 10^{8}$ dyne/sq.cm
Linear wear at a specific pressure of 1 kgf/sq.mm — $3.7 \times 10^{-9}$
Coefficient of friction — 0.07
Upper temperature limit — 350° C.
Lower temperature limit — minus 150° C.

EXAMPLE 6

20 g of poly(butadiene) of molecular weight 300,000, 60 g of graphite and 20 g of powdered copper are mixed on microrollers and pressed for one hour at a pressure of 7,000 kg/sq.cm and a temperature of 280° C.

The product antifriction material has the following physical and mechanical characteristics:

Poly(butadiene) cross-linking degree — 90%
Shear modulus — $5.3 \times 10^{10}$ dyne/sq.cm
Vickers hardness — 46.4 kgf/sq.mm
Coefficient of friction — 0.06
Upper temperature limit — 350° C.
Lower temperature limit — minus 150° C.

EXAMPLE 7

70 g of poly(butadiene) of molecular weight 80,000, 10 g of molybdenum disulphide and 20 g of powdered copper are mixed on microrollers and pressed for 30 minutes at a pressure of 5,000 kg/sq.cm and a temperature of 330° C.

The product antifriction material has the following physical and mechanical characteristics:

Poly(butadiene) cross-linking degree — 81%
Shear modulus — $1.3 \times 10^{10}$ dyne/sq.cm
Vickers hardness — 47.4 kgf/sq.mm
Coefficient of friction — 0.12
Upper temperature limit — 350° C.
Lower temperature limit — minus 150° C.

EXAMPLE 8

30 g of poly(butadiene) of molecular weight 219,000 and 70 g of molybdenum disulphide are mixed on microrollers and pressed for 30 minutes at a pressure of 3,000 kg/sq.cm and a temperature of 250° C.

The product antifriction heat-resistant self-lubricanting material has the following characteristics:

Poly(butadiene) cross-linking degree — 47%
Shear modulus — $9.6 \times 10^8$ dyne/sq.cm
Linear wear at a specific pressure of 1 kgf/sq.mm — $1.6 \times 10^{-9}$
Coefficient of friction — 0.06
Upper temperature limit — 350° C.
Lower temperature limit — minus 150° C.

What is claimed is:

1. A self-lubricating heat-resistant material, consisting of from 20 to 90 percent by weight of poly(butadiene) with a degree of cross-linking in the final product of from 30 to 95 percent, and from 10 to 80 percent by weight of an antifriction filler selected from the group consisting of molybdenum disulphide, graphite, boron nitride and a mixture of said compounds.

2. A self-lubricating heat-resistant material as set forth in claim 1, which comprises from 30 to 50 percent by weight of poly(butadiene) with a degree of cross-linking in the final product of from 30 to 95 percent and from 50 to 70 percent by weight of molybdenum disulphide.

3. A self-lubricating heat-resistant material, consisting of from 20 to 70 percent by weight of poly(butadiene) with a degree of cross-linking in the final product of from 30 to 95 percent, from 10 to 60 percent by weight of an antifriction filler selected from the group consisting of molybdenum disulphide, graphite, boron nitride and a mixture of said compounds, and from 20 to 40 percent by weight of powdered copper.

4. A process for manufacturing a self-lubricating heat-resistant material consisting of from 20 to 90 percent by weight of poly (butadiene) with a degree of cross-linking in the final product of from 30 to 95 percent, and from 10 to 80 percent by weight of an antifriction filler selected from the group consisting of molybdenum disulphide, graphite, boron nitride and a mixture of said compounds, which comprises pressing a composition consisting of from 20 to 90 percent by weight of poly(butadiene) of molecular weight from 20,000 to 800,000 and from 10 to 80 percent by weight of an antifriction filler selected from the group consisting of molybdenum disulphide, graphite, boron nitride and a mixture of said compounds, the pressing procedure being effected at a temperature of from 200° to 330° C. and a pressure of from 1,000 to 7,000 kg/sq.cm.

5. A process for manufacturing a self-lubricating heat-resistant material consisting of from 20 to 70 percent by weight of poly(butadiene) with a degree of cross-linking in the final product of from 30 to 95 percent, from 10 to 60 percent by weight of an antifriction filler selected from the group consisting of molybdenum disulphide, graphite, boron nitride and a mixture of said compounds, and from 20 to 40 percent by weight of powdered copper, which comprises pressing a composition made up of from 20 to 70 percent by weight of poly(butadiene) of molecular weight from 20,000 to 80,000, from 10 to 60 percent by weight of an antifriction filler selected from the group consisting of molybdenum disulphide, graphite, boron nitride and a mixture of said compounds, and from 20 to 40 percent by weight of powdered copper, the pressing procedure being effected at a temperature of from 200° to 330° C. and a pressure of from 1,000 to 7,000 kg/sq.cm.

* * * * *